(No Model.)
M. B. FULLER.
COMBINED HAND CORN PLANTER AND FERTILIZER DISTRIBUTER.
No. 270,581. Patented Jan. 16, 1883.
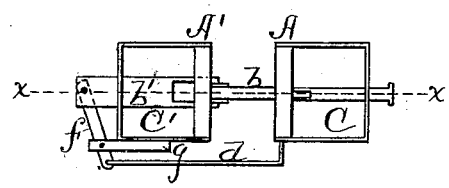
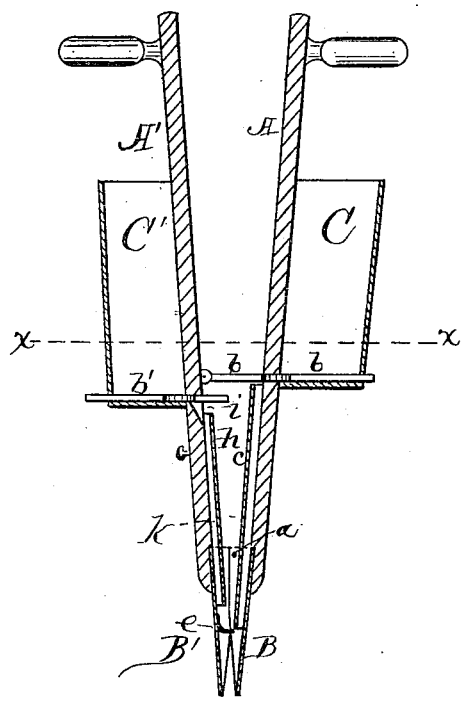
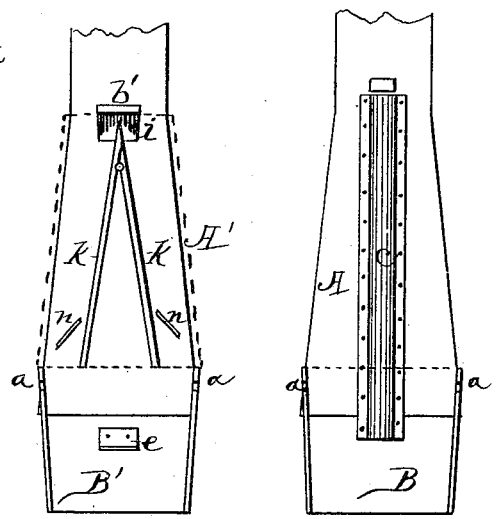

UNITED STATES PATENT OFFICE.

MERRITT B. FULLER, OF SANBORN, NEW YORK.

COMBINED HAND CORN-PLANTER AND FERTILIZER-DISTRIBUTER.

SPECIFICATION forming part of Letters Patent No. 270,581, dated January 16, 1883.

Application filed September 4, 1882. (No model.)

*To all whom it may concern:*

Be it known that I, MERRITT B. FULLER, a citizen of the United States, residing at Sanborn, in the county of Niagara and State of New York, have made certain Improvements in a Combined Hand Corn-Planter and Fertilizer-Distributer, of which the following is a specification.

The object of this invention is more particularly to drop the corn and distribute the fertilizer alternately; also, by slanting flues or spouts, to distribute the fertilizer each side of the corn, not on it, under it, or close to it, but separated from the corn by earth. When deposited together the fertilizer is apt to take the moisture from the soil to the detriment of the sprouting of the grain, and if the ground be dry is apt to kill it or keep it from sprouting.

In the drawings, Figure 1 is a sectional side elevation of the whole device; Fig. 2, a plan in cross-section through line *x x*, Fig. 1, showing the operation of the fertilizing sliding bar or plate; Fig. 3, details of the lower parts of the sides and their points, &c., enlarged.

A A' represent the two sides, with the handles and the usual metal points, B B', which are hinged together at the top at *a* (see Fig. 1) in any suitable manner, to open and close the points by the action of the handles.

C is the usual corn-hopper, and C' the fertilizer-hopper.

*b* is the usual sliding plate, that carries the corn to the dropping-spout *c* on side A, and which is operated by being attached to the opposite side, A', as shown, so that when the sides are drawn apart the plate *b* is pulled out sufficiently to carry the corn to the spout *c*. At the bottom opening of this spout *c* comes a closing-piece, *e*, being a piece of metal, attached opposite to the inside of point B', and which closes the spout-opening when the sides A A' are drawn apart. This is important, as it prevents the corn from scattering too much, as is the case when open, and dropping into the point B; but when my closer is drawn away it drops directly into the ground just beneath the tube and will not therefore mix with the fertilizer, which is distributed as follows:

*b'* is the sliding plate in the hopper C'. It is operated by a rod, *d*, with one end attached to the side A, the other end to a strap or link, *f*, which is pivoted first to an arm, *g*, attached to side A' or the hopper C', and, lastly, to the end of the sliding plate *b'*, outside the hopper, all as clearly shown in Fig. 2.

The action is: When the sides A A' are pulled apart and the points B B' pushed into the ground the corn-slide *b* is pulled out and the fertilizer-slide *b'* pushed in, and when the sides A A' are closed together the fertilizer plate or slide *b'* is pushed in sufficient to carry the fertilizer thereon to its spout *h*, (shown in section, Fig. 1, and in dotted lines, Fig. 3,) which is fastened to side A'. In this spout are arranged a separating piece or pieces, *k k*, which may be spouts or merely dividing the space into flues, and which slant outward from the opening *i* about to the top of the metal point B', as shown in Fig. 3. These may be set to adjust them to any desired angle. Setting the lower ends wider apart will distribute the fertilizer farther from the grains of corn dropped from the tube *c*, and bringing the ends nearer together will distribute nearer the corn, as there is a difference in the strength and chemical action in different fertilizers. If strong it should be deposited farther from and if milder nearer to the corn, the greater object being to prevent the fertilizer dropping directly onto the corn, as previously stated. To further aid in thoroughly distributing the fertilizer I set slanting pieces or shelves *n n* against the inside of the side A' in the spout *h*. (See Fig. 3.) These devices are all to prevent the fertilizer falling straight down onto the corn or in spots or lumps. The corn which goes into the tube *c* is there held until the closing of the sides A A' withdraws the closer *e* from the mouth. It then drops directly into the ground through the open points B B', and is immediately followed by the gradual dropping of the fertilizer, distributed to its proper position by the flues or tubes *k k* and shelves *n n*, or equivalent distributing devices.

I do not claim either the sides A A', hoppers C C', slides *b b'*, or the points B B'.

I claim—

1. In a combined hand corn-planter and fertilizer-distributer, the combination, with the chambers for containing the seed and fertilizer and the hinged sides on which they are respectively placed, of an operating means for opening the said chambers at alternating periods, the chamber on one side being opened by the opening and that on the other being opened by the closing of the sides, as herein set forth.

2. The combination of the fertilizer-hopper C', sliding plate b', rod d, one end fastened to side A, the arm g, and the strap f, pivoted to arm g and to the sliding plate b', all operated by the opening and closing of the sides A A', substantially as and for the purpose specified.

3. In a hand corn-planter and fertilizer-distributer, the combination, with the hinged sides and receptacles attached thereto, of the seed-spout located centrally on one side and the fertilizer-spout h on the other, divided into flues, which part the stream of fertilizer and direct it away from and on either side of the dropped seed, as set forth.

4. In a double-jawed corn-dropper, the combination, with the jaws B B' and the corn-tube c, of the closing-piece e, secured to one side, B', of the jaws at a point which brings it, when the jaws are closed, against the base of the spout c, substantially as set forth.

In witness whereof I have hereunto signed my name in the presence of two subscribing witnesses.

MERRITT B. FULLER.

Witnesses:
J. R. DRAKE,
T. H. PARSONS.